(12) United States Patent
Maxwell et al.

(10) Patent No.: US 7,344,429 B2
(45) Date of Patent: Mar. 18, 2008

(54) NOISE PRODUCING DEVICE

(76) Inventors: Thomas Maxwell, Coolfin Rectory, Coolfin, Portlaw, County Waterford (IE); Gavin Maxwell, Coolfin Rectory, Coolfin, Portlaw, County Waterford (IE)

( * ) Notice: Subject to any disclaimer, the term of this patent is extended or adjusted under 35 U.S.C. 154(b) by 113 days.

(21) Appl. No.: 10/544,819

(22) PCT Filed: Jan. 27, 2004

(86) PCT No.: PCT/IE2004/000012

§ 371 (c)(1),
(2), (4) Date: Aug. 5, 2005

(87) PCT Pub. No.: WO2004/069637

PCT Pub. Date: Aug. 19, 2004

(65) Prior Publication Data

US 2006/0145448 A1 Jul. 6, 2006

(30) Foreign Application Priority Data

Feb. 6, 2003 (IE) .............................. S2003/0076
Sep. 23, 2003 (IE) .............................. S2003/0695

(51) Int. Cl.
*A63H 5/00* (2006.01)

(52) U.S. Cl. .................................... 446/404; 280/288.4
(58) Field of Classification Search .................... None
See application file for complete search history.

(56) References Cited

U.S. PATENT DOCUMENTS

| 2,719,385 | A | * | 10/1955 | Wilson | 466/404 |
| 2,987,850 | A | * | 6/1961 | Bergland | 446/404 |
| 3,131,507 | A | * | 5/1964 | Richter | 446/404 |
| 4,735,592 | A | * | 4/1988 | Griffin | 446/404 |
| 6,039,338 | A | * | 3/2000 | Perea et al. | 280/288.4 |
| 6,394,875 | B1 | * | 5/2002 | Smith | 446/404 |

* cited by examiner

*Primary Examiner*—Kien Nguyen
(74) *Attorney, Agent, or Firm*—Cowan, Liebowitz & Latman, P.C.

(57) ABSTRACT

A noise-producing device comprises a body (12) having a clamp (24) for mounting the body to a frame member of a bicycle or other motorless vehicle with spoked wheels. The device includes a card holder (15) for securing a resiliently flexible card (14) to the body such hat the card extends freely outwardly from the body. A resonant chamber (18) in the body amplifies the sound produced by the intermittent interaction of the free end of the card with the spokes of the bicycle wheel.

22 Claims, 16 Drawing Sheets

NOISE PRODUCING DEVICE

FIELD OF THE INVENTION

The present invention relates to devices for producing noise. The invention has particular application in devices for producing noise when mounted on an vehicle without an engine, such as a bicycle, tricycle, or motorless scooter.

BACKGROUND OF THE INVENTION

Children using bicycles will often add a simple device for producing noise to simulate the sound of a combustion engine. This may be done by attaching a playing card to a frame member of the bicycle, usually the rear stay, with a clip such as a clothes peg so that the card projects between the spokes. When the wheels turn, the spokes rapidly strike the card producing a noise which somewhat approximates that of an engine.

Various custom-designed devices have been proposed to improve on such home made arrangements. Examples of such devices are described in U.S. Pat. Nos. 3,716,944, 3,905,151, 4,701,149, 4,875,885, 5,226,846, 5,611,558 and U.S. Pat. No. 6,394,875.

These devices suffer from various shortcomings which the present invention is intended to address.

SUMMARY OF THE INVENTION

The invention provides a noise-producing device comprising a body having means for mounting the body to a frame member of a bicycle, a card holder for securing a resiliently flexible card-like member ("card") to the body such that the card extends freely outwardly from the body, and a resonant chamber in the body for amplifying the sound produced by the intermittent interaction of the free end of the card with a bicycle wheel.

The term "bicycle" as used herein is intended to encompass bicycles, tricycles, scooters and other motorless vehicles having wheels of a type which when rotated will vibrate a card to produce a noise, such as spoked wheels.

Preferably the device includes a hollow component in the form of a simulated exhaust removably mountable on the body with its interior in communication with the resonant chamber for further amplifying the sound produced by the card.

The means for mounting the body to a frame member of a bicycle may comprise an open channel extending into the body in which a frame member can be received. In such case the open channel may comprise a pair of side walls and a base for receiving the frame member, the device further including a fastening means to draw the side walls together and thereby grip the frame member in the base.

Preferably the card holder comprises a slot which is adapted to retain the card by its edges so that a majority of the surface of the card facing away from the body is exposed.

Further, the resonant chamber is preferably open to the surface of the card facing towards the body.

The invention further comprises the combination of a device as specified above and a resiliently flexible card-like member mounted in the card holder.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
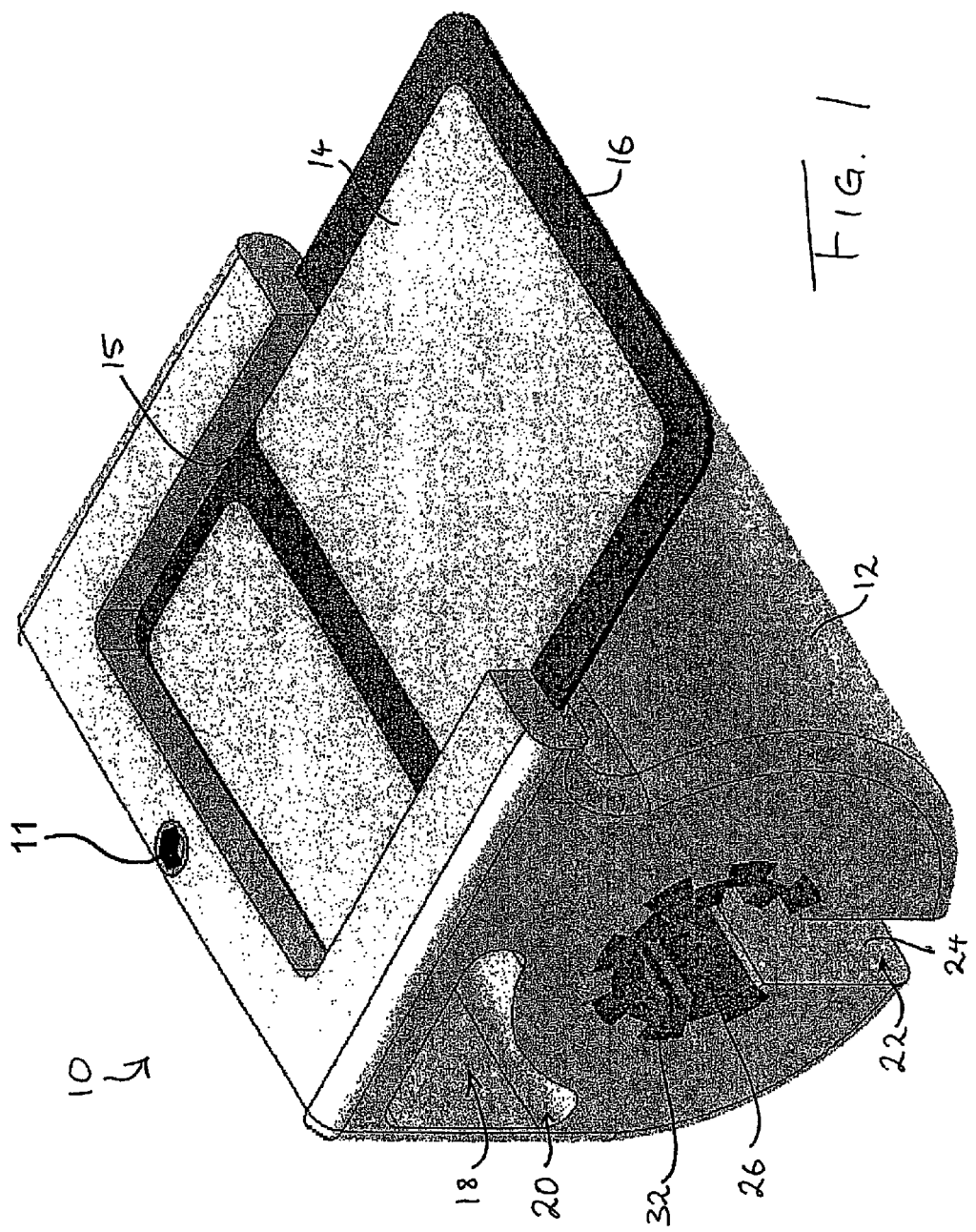
FIG. 1 is a perspective view from above of a noise-producing device according to a first embodiment of the invention.
Figure 2:
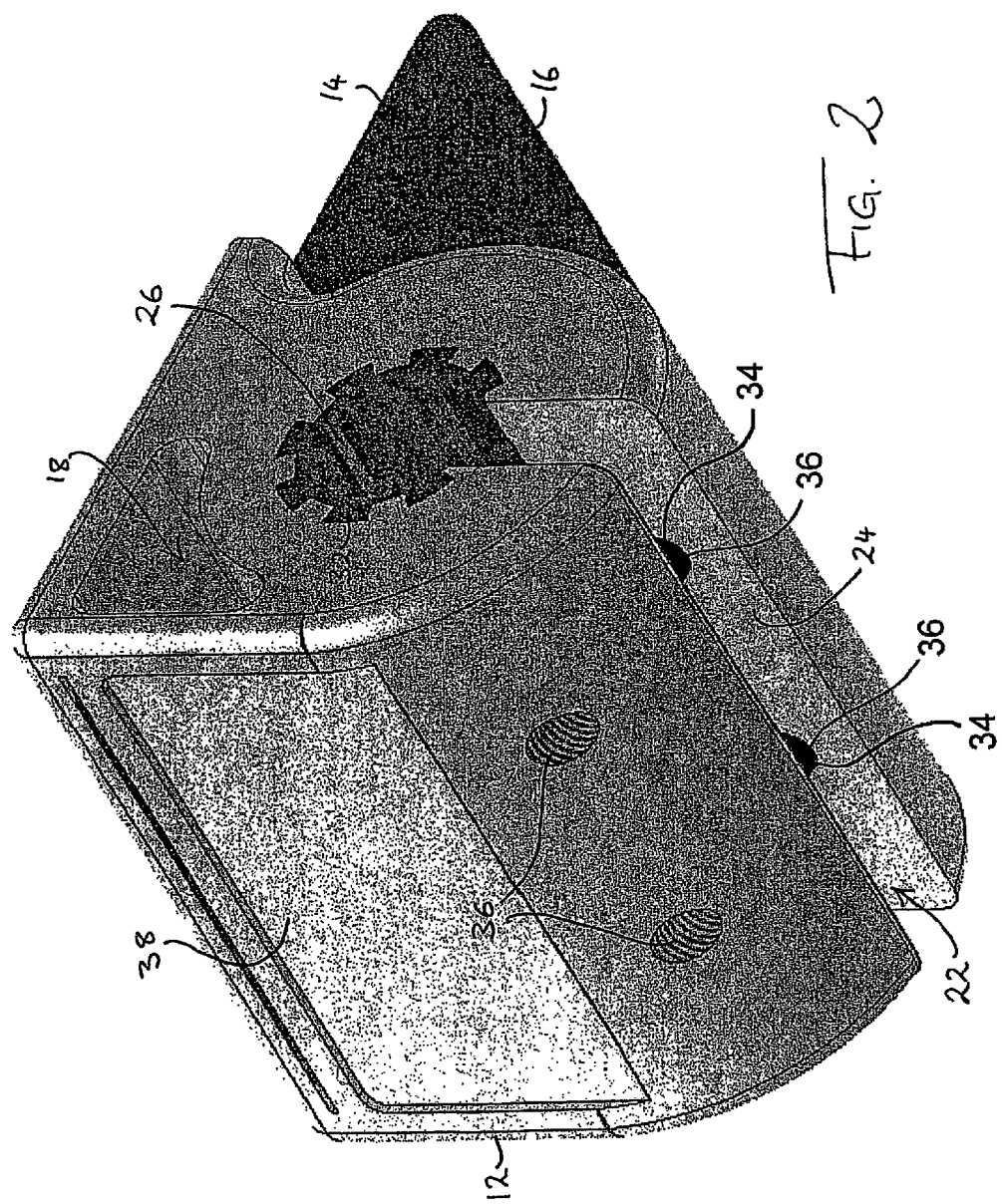
FIG. 2 is a perspective view from below of the device of FIG. 1.
Figure 3:
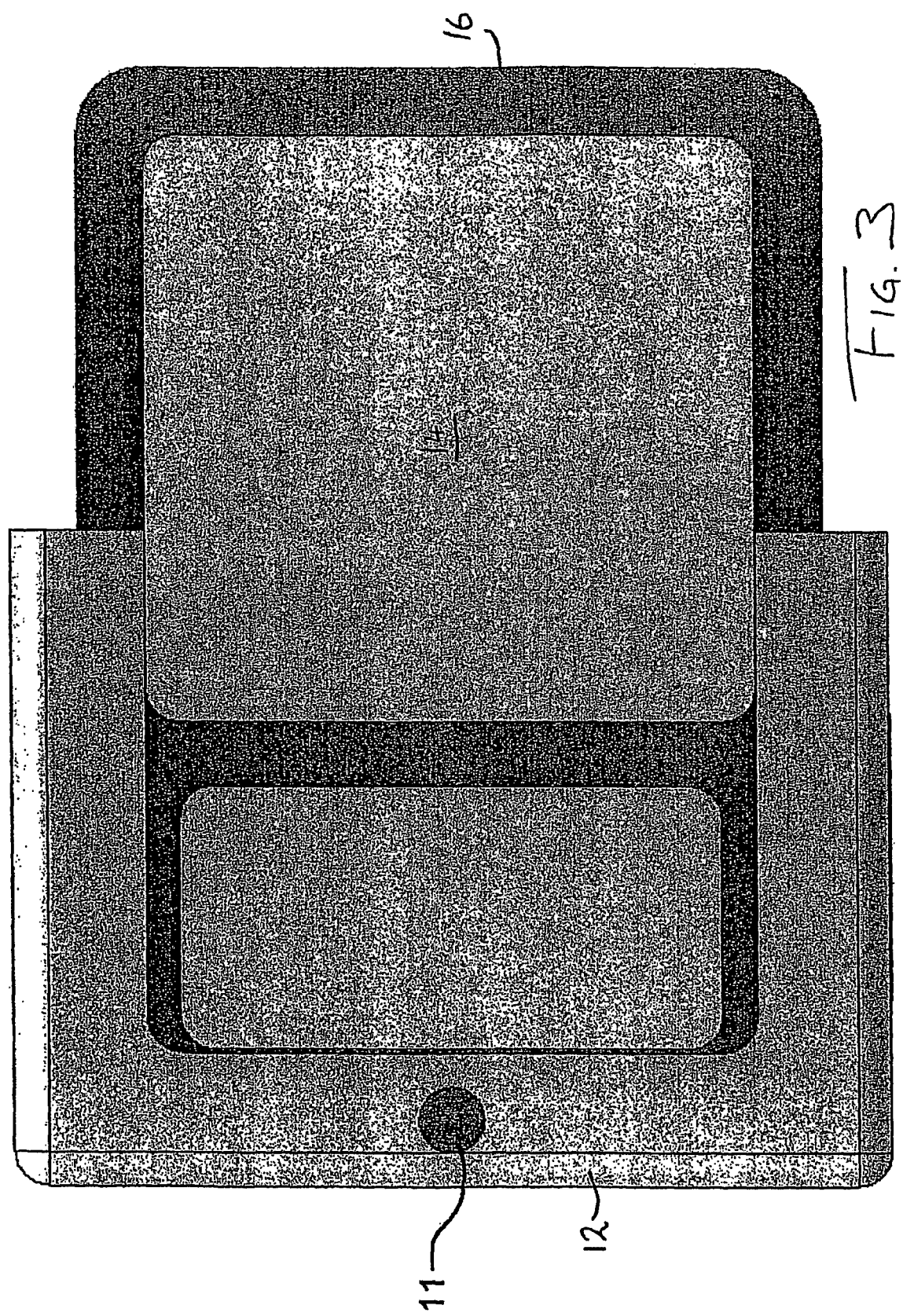
FIG. 3 is a top plan view of the device of FIG. 1.
Figure 4:
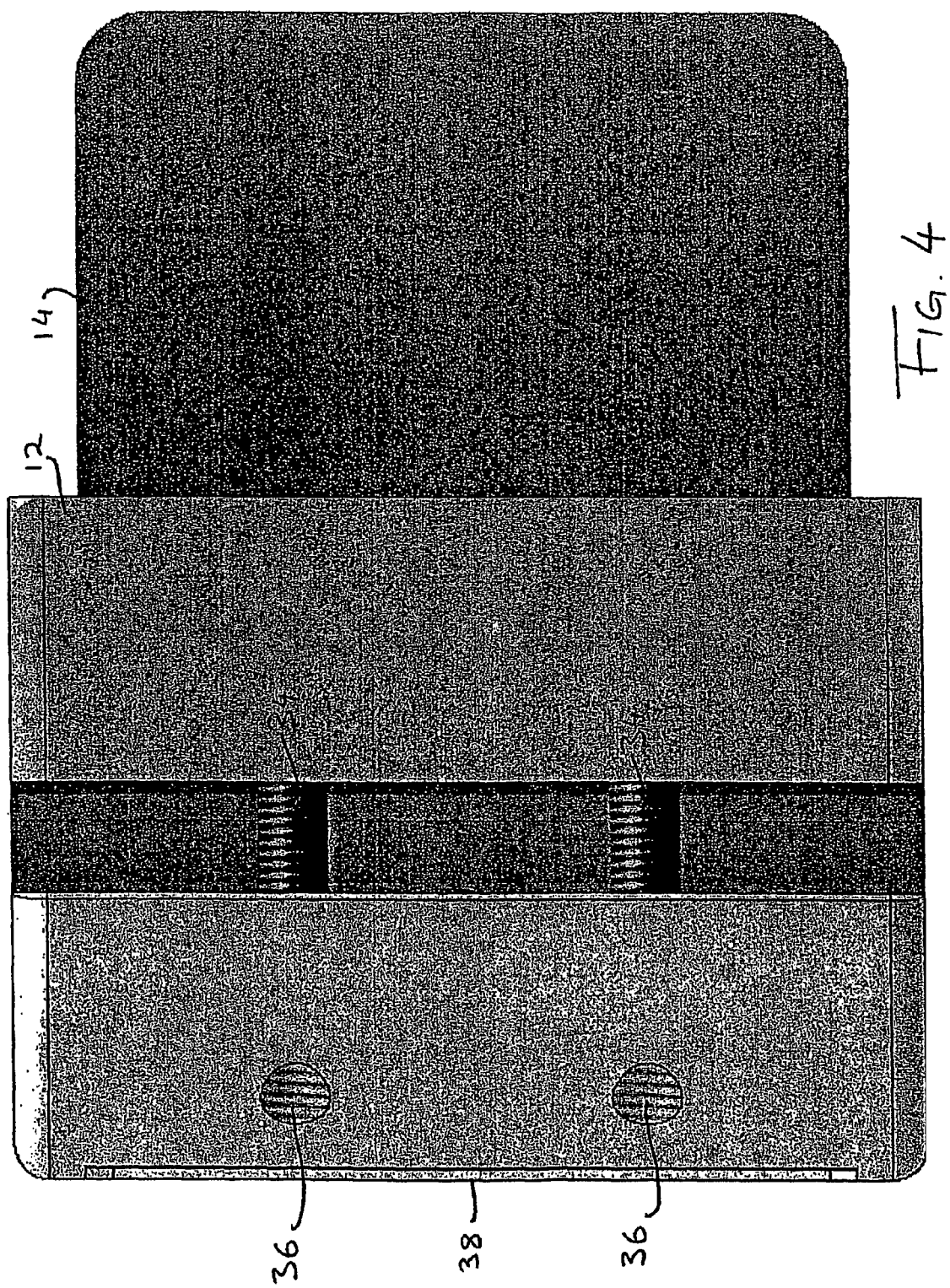
FIG. 4 is a bottom plan view of the device of FIG. 1.
Figure 5:
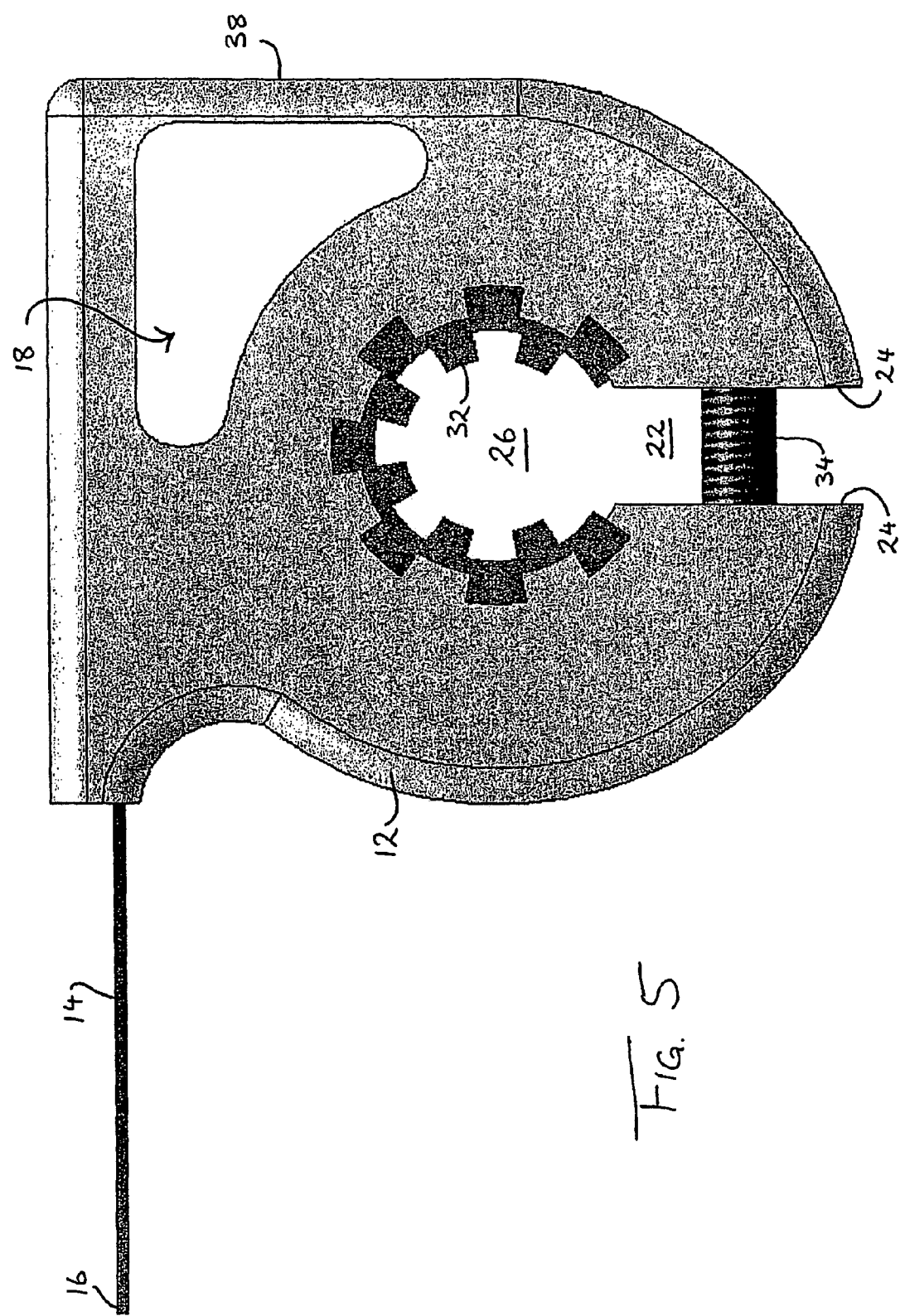
FIG. 5 is a side view of the device of FIG. 1.
Figure 6:
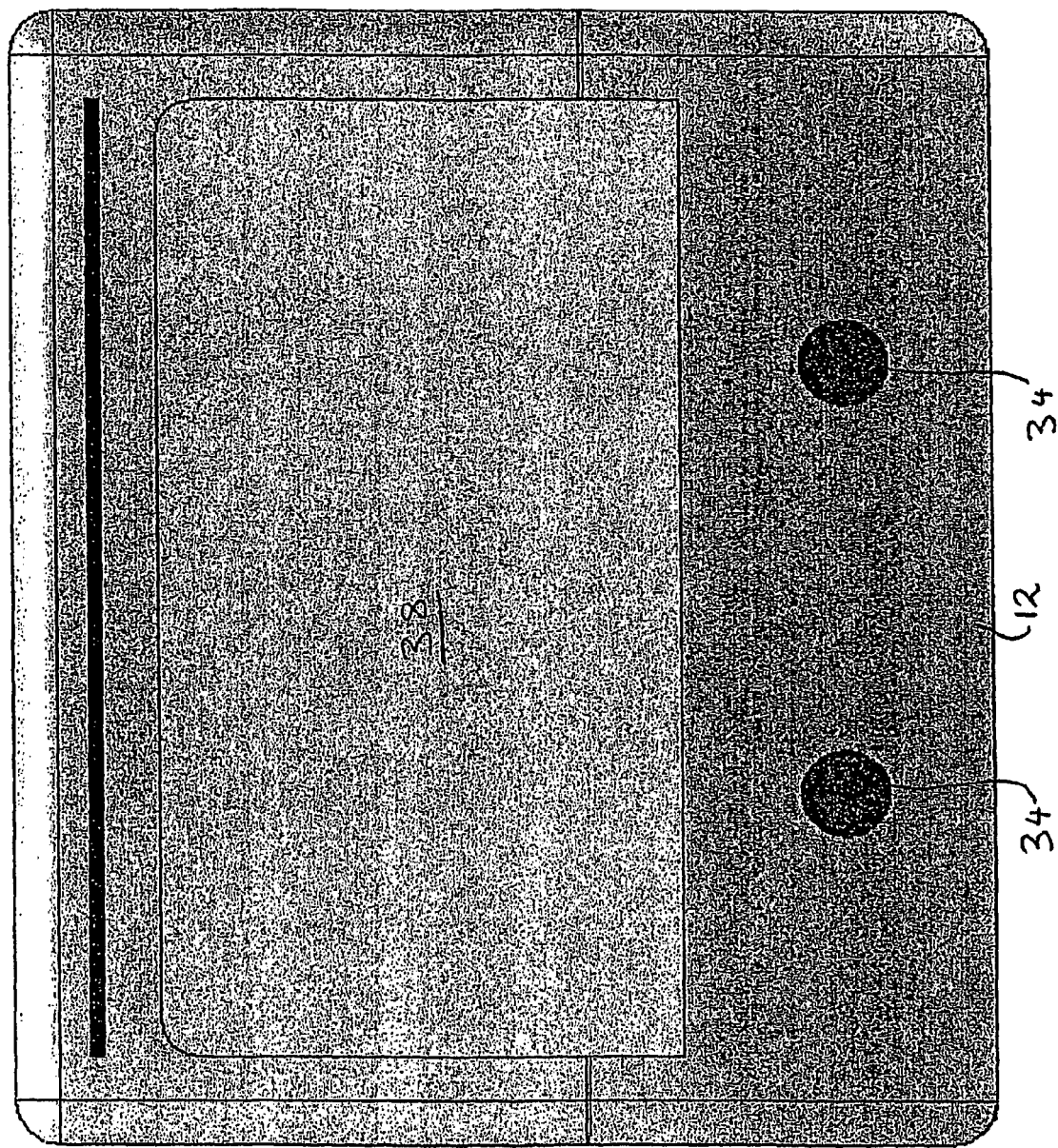
FIG. 6 is a front elevation of the device of FIG. 1.
Figure 7:
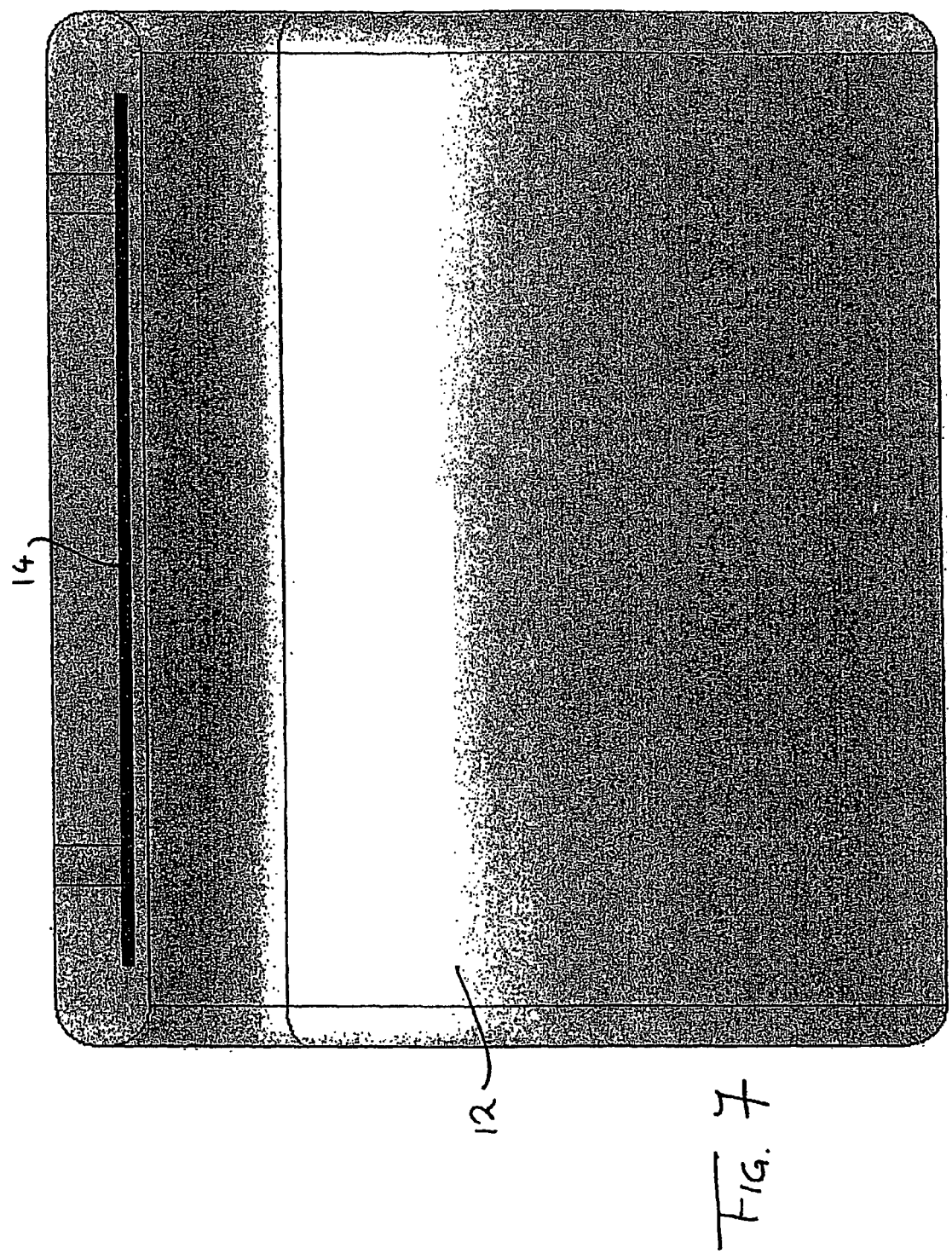
FIG. 7 is a rear elevation of the device of FIG. 1.

FIGS. 1 to 7 together show a first embodiment of noise-producing device according to the invention. The device 10 comprises a body 12 into which a resiliently flexible card-like member 14 ("card") is mounted. The card 14 may be replaceable or it may be fixed in place at the time of assembly of the device by the user. The body 12 is moulded of a semi-rigid plastics material and the card 14 is made, for example, of polypropylene.

The card 14 is retained by its edges in a slot 15 which snugly receives and surrounds one end of the card on three sides so that a free end 16 of the card extends from the body 12 and a majority of the surface of the card facing away from the body 12 is exposed. The free end 16, when it protrudes into the spokes of a rotating spokes wheel, is repeatedly urged forward by successive spokes before snapping back towards its usual flat shape. This repetitive motion gives rise to an engine-like noise. In the present embodiment the card 14 is replaceable in the body 12 and is secured in place by a small allen bolt 11 which engages the end of the card within the slot 15.

A resonant chamber 18, in the form of a bore having a roughly triangular cross-section and open at each opposite end 20, extends through the body 12 in a direction transverse to the direction in which the card 14 extends from the body 12. The chamber 18 amplifies the noise transmitted from the card to the body providing a more realistic, fuller sound. A pair of end caps (not shown) may be provided to seal the open chamber ends 20 to vary the resonant characteristics of the chamber.

The device is mounted on the frame of a bicycle 30 (see also FIG. 8) by means of an open channel 22 having opposed sidewalls 24 and a base 26 which is shaped to receive a frame member such as a rear stay 28 of bicycle 30. The channel 22 is substantially parallel to the resonant chamber 18.

A castellated compressible material 32 lines the base 26 to improve the grip of the mounting. A pair of alien bolts 34 each extends through a pair of threaded holes 36 in opposite sidewalls 24 to allow the sidewalls to be drawn together when a frame member, such as the rear stay 28, is engaged in the base 26. Tightening or loosening the allen bolts increases or relaxes the grip of the base on the frame member. When the allen bolts are removed, the device can be engaged or disengaged from the frame member.

Figure 8:
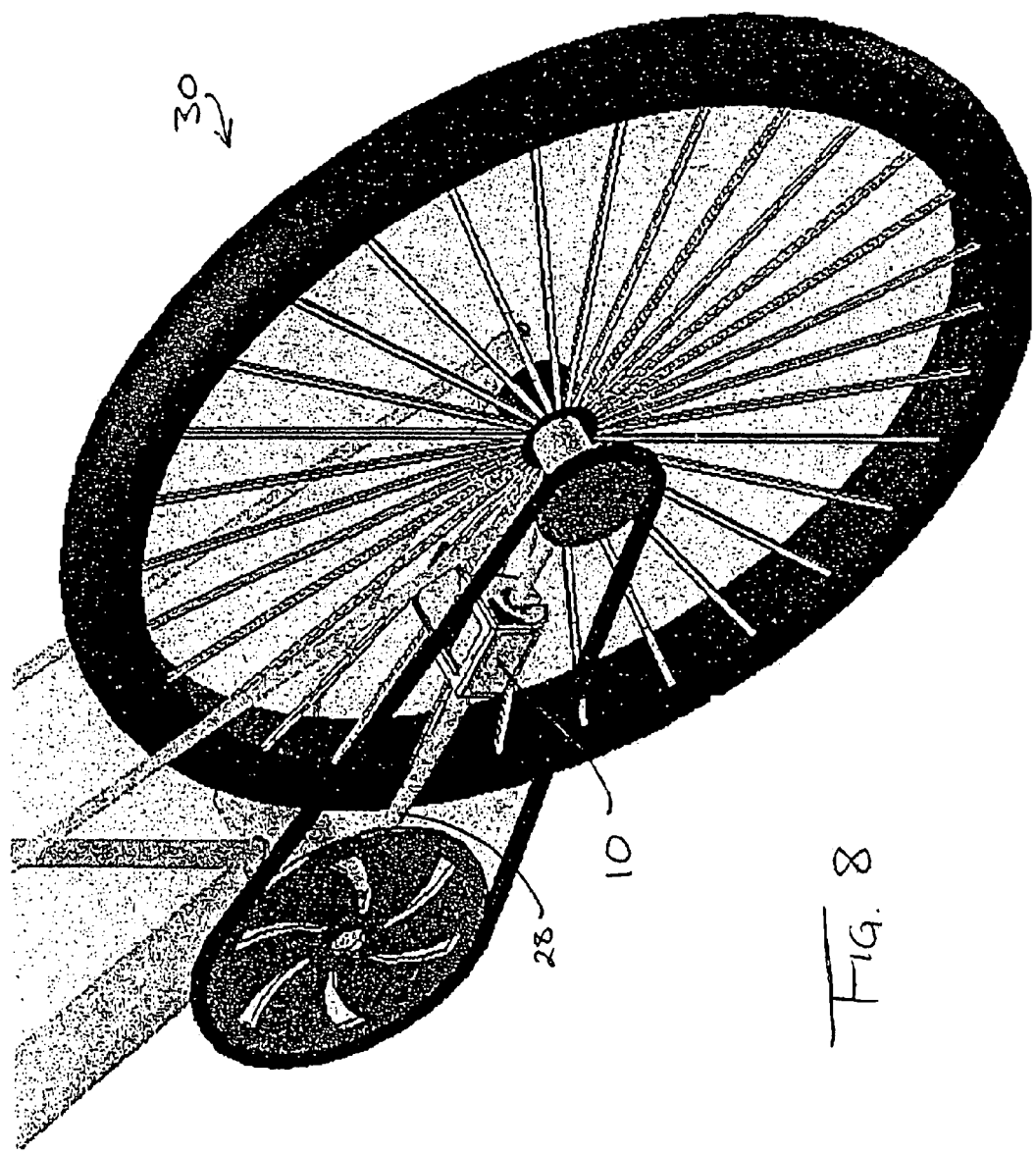
FIG. 8 shows the device of FIG. 1 when mounted on a bicycle.

When the device is mounted on a bicycle 30 as shown in FIG. 8, a display area 38 having a flat surface faces generally outward (i.e. away from the wheel). This display area provides a surface for receiving printed indicia or adhesive labels, to provide branding or advertising space which is readily visible on the device. Alternatively, a brand name or logo can be moulded in relief on the display area 38, as an integral part of the body 12, as shown FIGS. 9 and 10 of the second embodiment to be described. Due to the noise produced by the device in use, and the natural tendency of the eye to be drawn to a source of noise, the display area 38 is particularly prominent and therefore valuable.

FIGS. 9 to 16 show a device 100 according to a second embodiment of the invention. In FIGS. 9 to 16, features and components the same or functionally equivalent to those shown in FIGS. 1 to 8 are given the same reference numerals will not be further described. The following description will therefore concentrate on the differences between the first and second embodiments.

Figure 9:
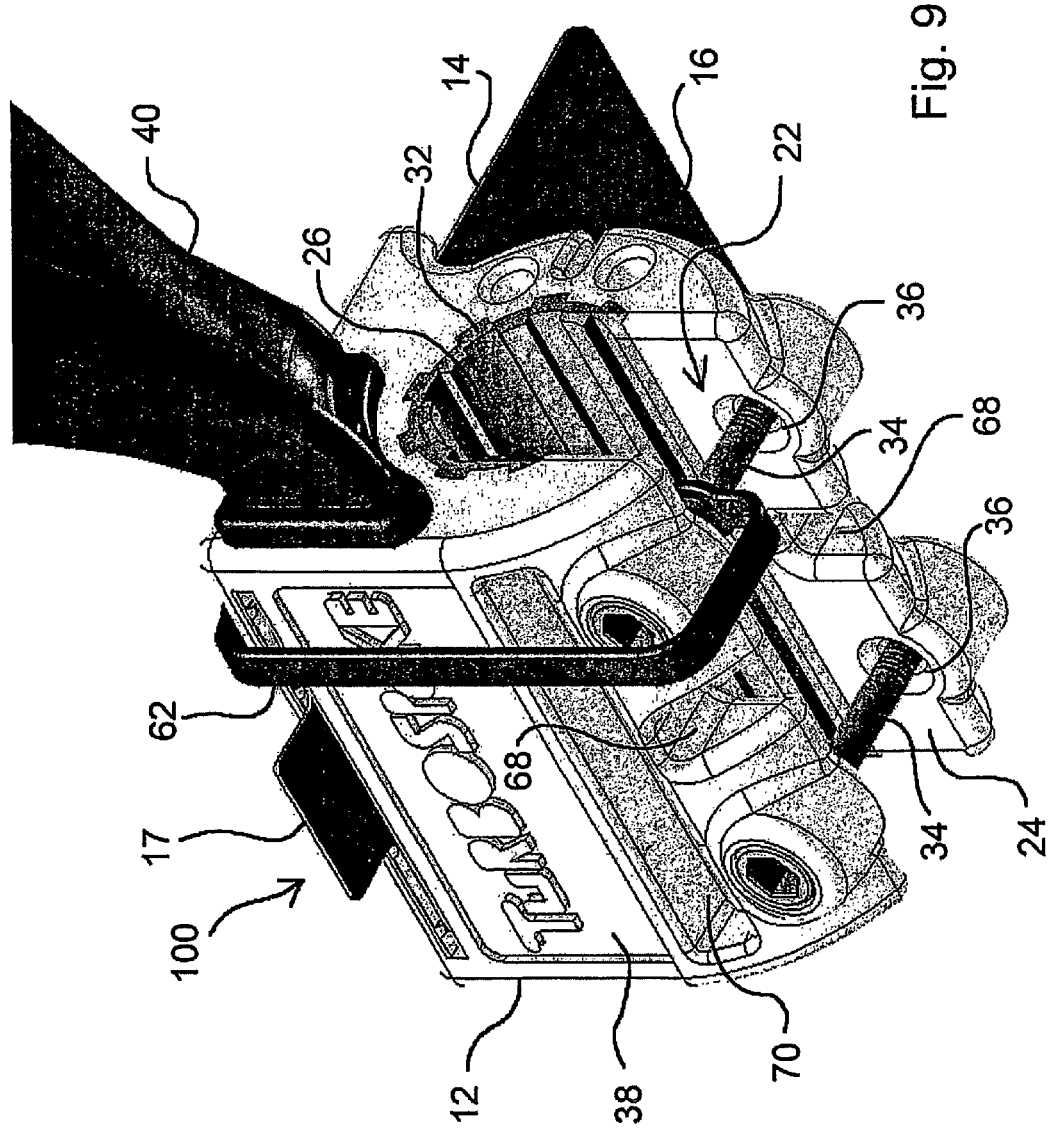
FIG. 9 is a perspective view from below of a noise-producing device according to a second embodiment of the invention.
Figure 10:
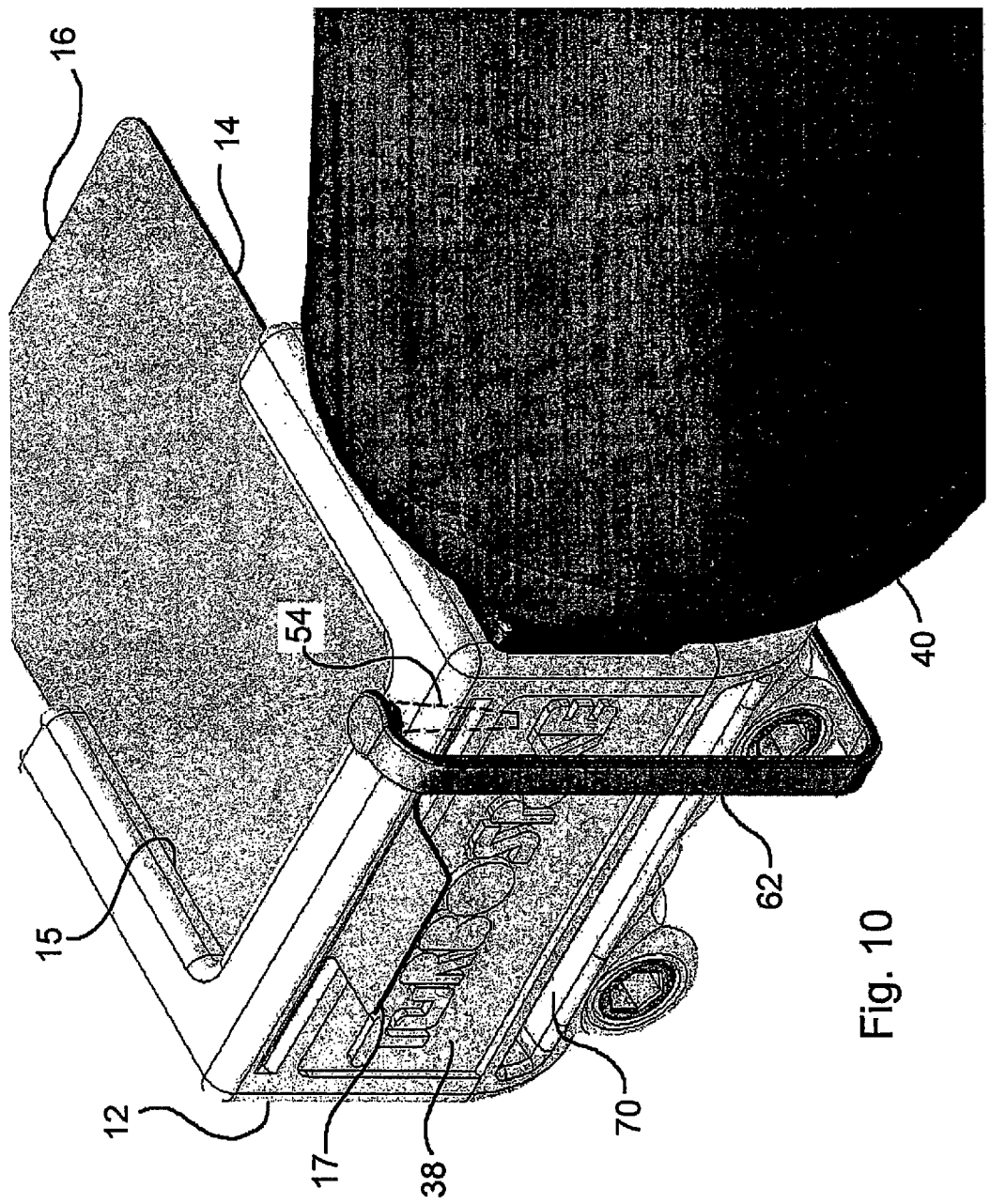
FIG. 10 is a perspective view from above of the device of FIG. 9.
Figure 11:
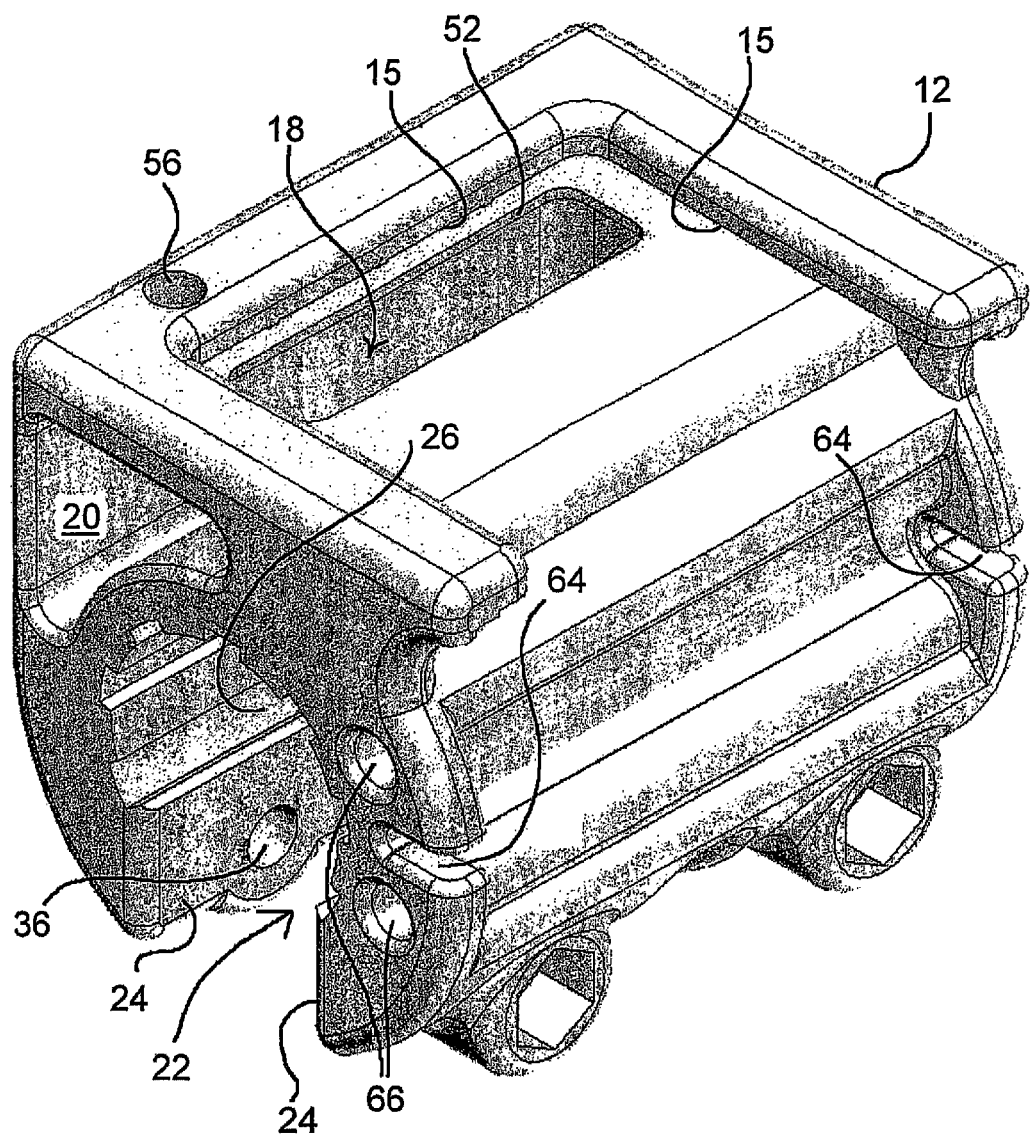
FIG. 11 is a perspective view from above of the main body of the device of FIG. 9, omitting the card, base liner, simulated exhaust and other attachments.
Figure 12:
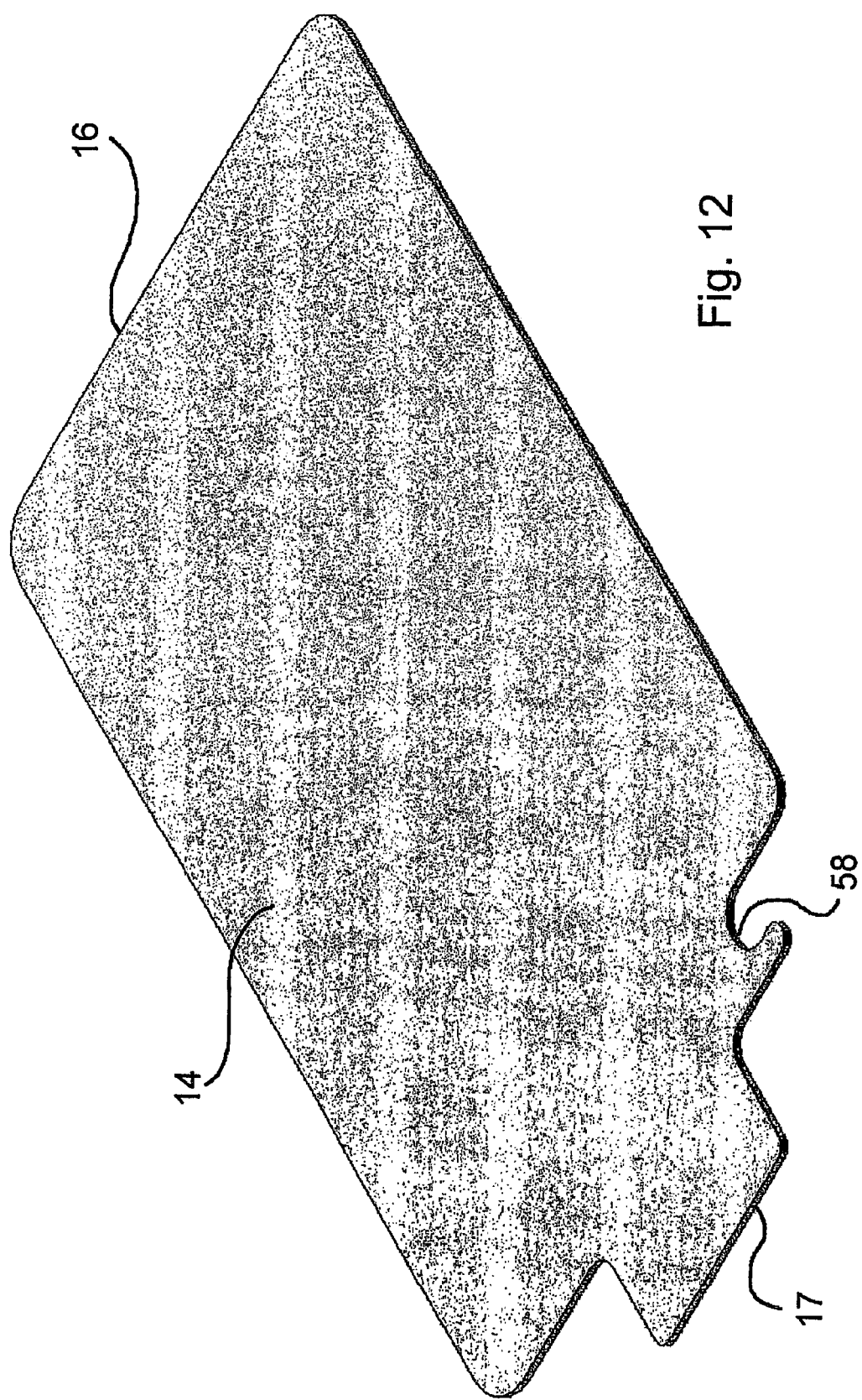
FIG. 12 is a perspective view of the card used in the device of FIG. 11.
Figure 13:
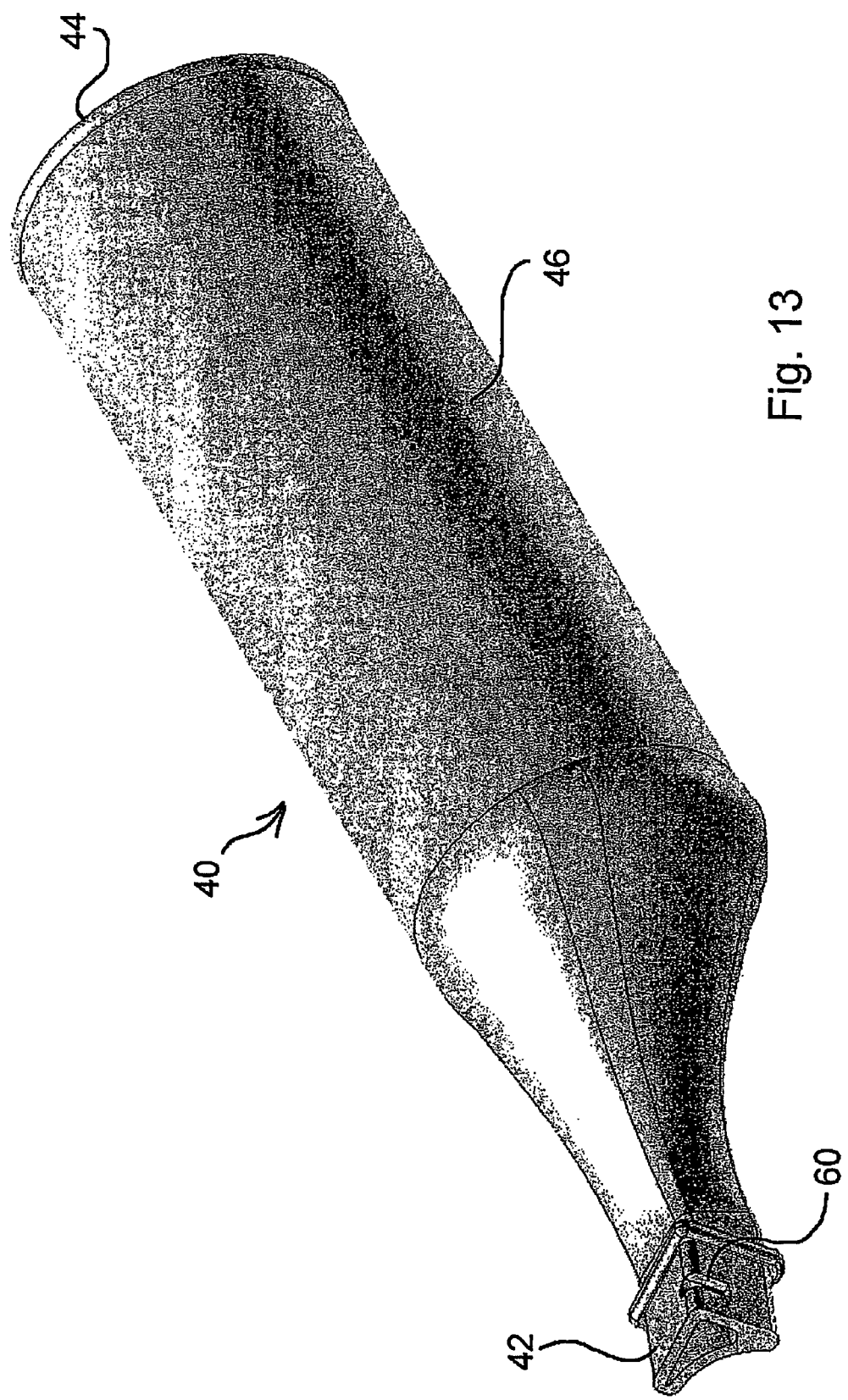
FIGS. 13 and 14 are perspective views of the simulated exhaust used with the device of FIG. 11.
Figure 14:
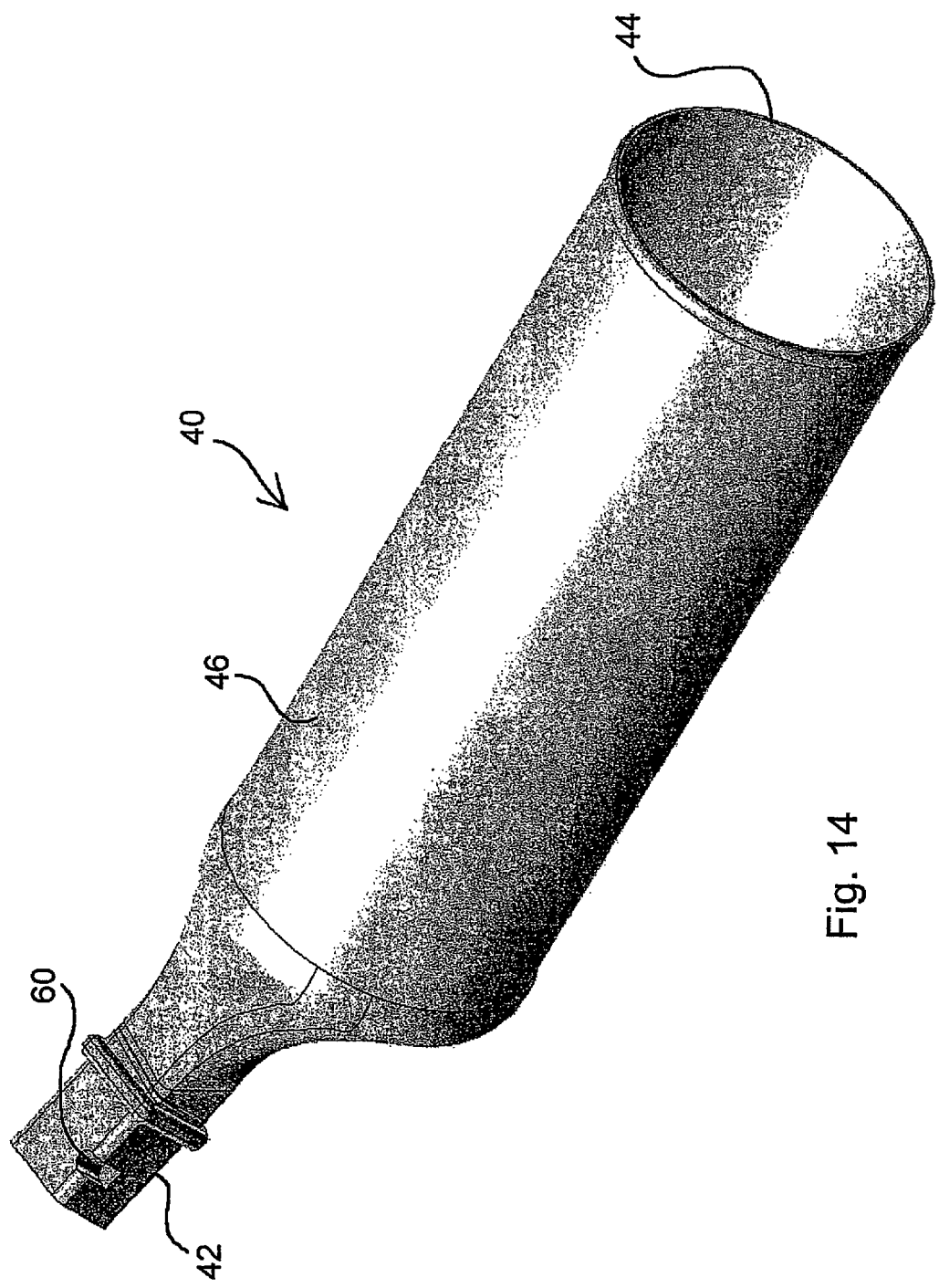
Figure 15:
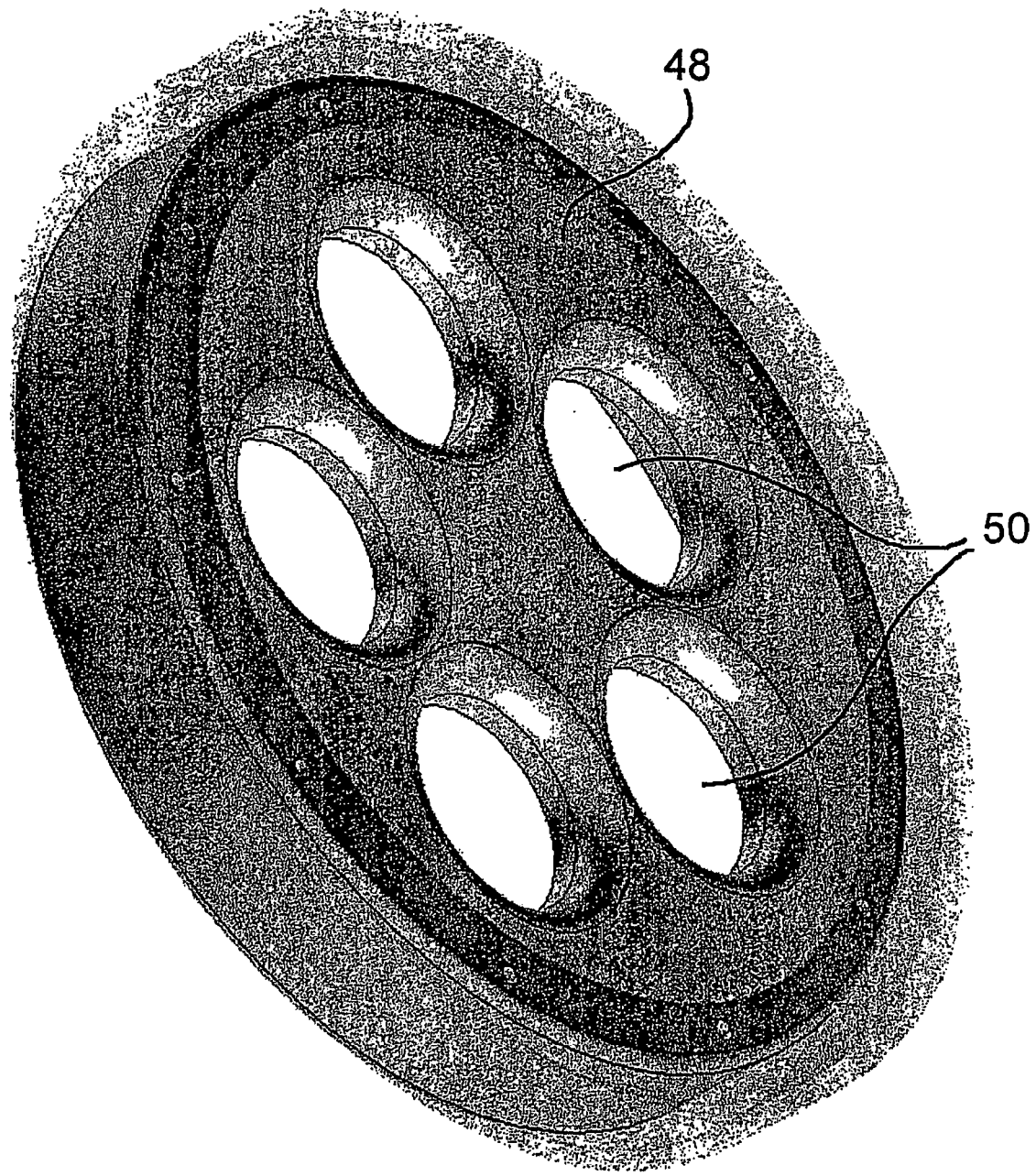
FIG. 15 is a perspective view of an apertured reflector fitted to the simulated exhaust of FIGS. 13 and 14.

The primary difference is that in the device 100 the resonant chamber 18 is only open at one end, i.e. the end 20 seen in FIG. 11, and that in use a hollow simulated exhaust 40 (FIGS. 9, 10, 13 and 14) is removably mounted on the body 12 with its interior in communication with the chamber 18 via the open end 20. The simulated exhaust 40 has a generally funnel-like shape with an open, relatively narrow, front end 42 and an open, relatively wide, rear end 44, the main body of the exhaust being in the form of a hollow cylinder 46. The narrow front end 42 of the exhaust 40 has an external cross-section complementary to the interior cross section of the open end 20 of the bore 18, and the exhaust 40 is fitted to the body 12 by inserting the end 42 into the open end 20 as seen in FIGS. 9 and 10. The simulated exhaust 40 acts like a megaphone or loudspeaker to further amplify the sound produced by the card 14. A circular safety reflector 48, FIG. 15, may be fitted across the wide rear end 44 of the exhaust 40. This has a plurality of apertures 50 to allow the sound to escape from the simulated exhaust.

In this embodiment, too, the resonant chamber 18 has a top opening 52 within the area defined by the three sides of the slot 15 so that, in use, the chamber 18 is open to the surface of the card 14 facing towards the body 12. This enhances the transmission of sound from the card to the resonant chamber 18. Also, the card 14 has a tab 17 which projects out of the slot 15 when the card is fully inserted in the body 12, the tab 17 facilitating the user to insert and remove the card.

The card 14 and simulated exhaust 40 are retained in position on the body by a removable pin 54, shown in dashed lines in FIG. 10, which passes down into the chamber 18 through a hole 56 (FIG. 11) in the body 12. The pin 54 engages a semi-circular recess 58 (FIG. 12) in the card 14 to prevent its withdrawal from the body 12, and enters a groove 60 in the front end 42 of the exhaust to likewise prevent removal of the exhaust from the body 12. The pin 54 itself is prevented from coming out of the hole 56 by a strap 62, the pin 62 being integral with one end of the strap 62 and the other end of the strap being formed with a hole which is engaged by one of the bolts 34.

Figure 16:
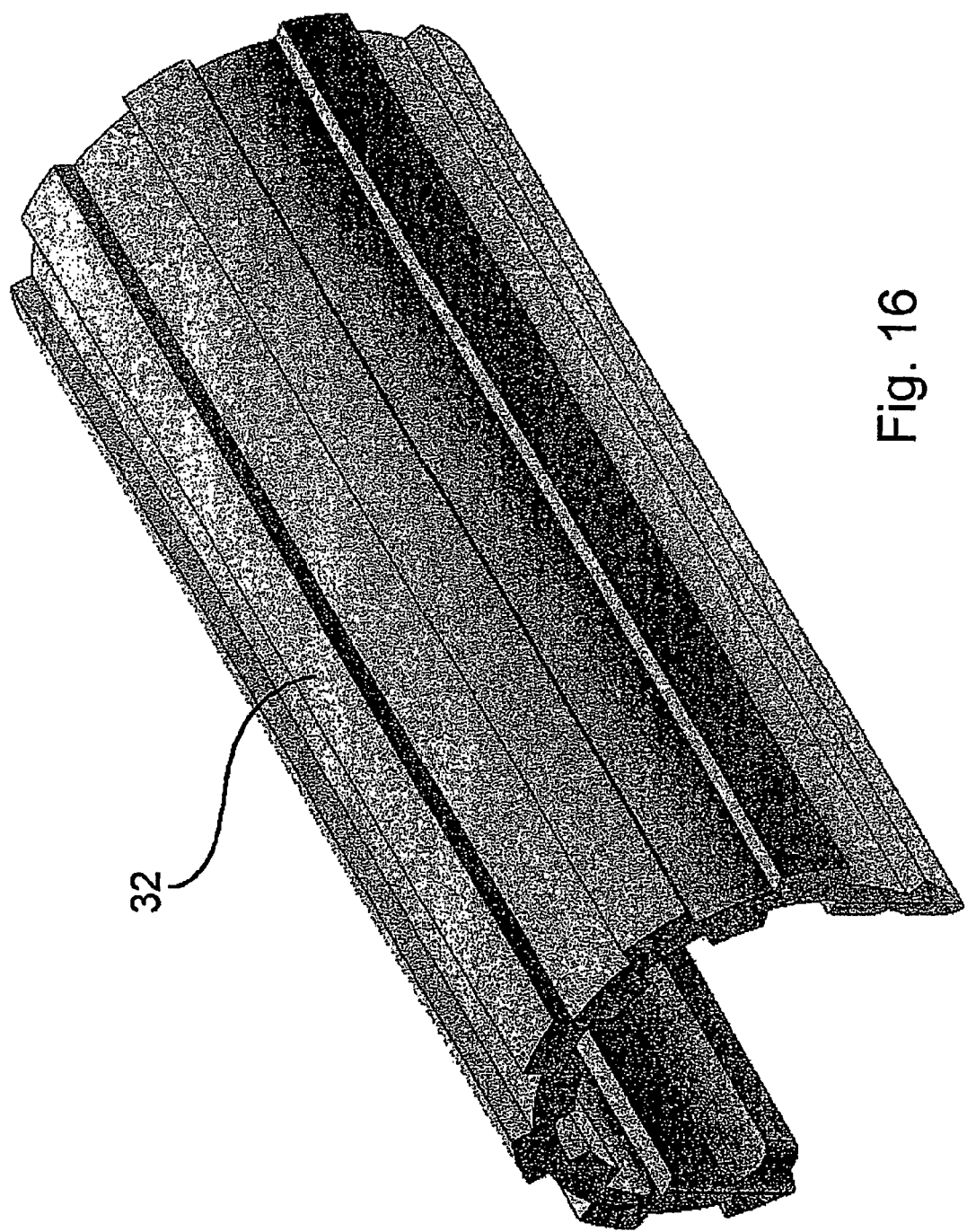
FIG. 16 is a perspective view of a base liner used in the device of FIG. 11.

In this embodiment the castellated material 32 is in the form of a replaceable liner of a semi-rigid plastics material, FIG. 16, so that bicycle frame members of different diameters can be accommodated by the use of liners 32 of different radial dimensions. Alternatively, a set of nested liners 32 can be provided, one or more being used according to the diameter of the frame member.

The moulded body 12 of the device 100 also has a number of features designed to assist cooling of the device in use and/or to assist flexing of the body to conform to different bicycle frame members. Slots 64 (FIG. 11) allow the body 12 to bend along a longitudinal axis at this point to clamp on to the bicycle frame member when the bolts 34 are tightened. Longitudinal holes 66 are formed in the body 12 above and below the slots 64 to provide mounting points for future items to be fitted to the body 12, as well as providing a weight and material saving and increasing the total surface area of the body 12 to assist its cooling in use. Recesses 68 (FIG. 9) running transversely of the channel 22 through the sidewalls 24 allow a slight bending of the body 12 in the longitudinal direction to accommodate any slight curvature in the bicycle frame member, as well as reducing weight/material usage and increasing the surface area of the body for cooling. Finally, a slot 70 in the side of the body 12 again reduces weight/material usage and increases the surface area of the body for cooling.

The invention is not limited to the foregoing examples which may be varied without departing from the scope of the claimed invention.

The invention claimed invention:

1. A noise-producing device comprising a body having means for mounting the body to a frame member of a bicycle, a card holder for securing a resiliently flexible card-like member ("card") to the body such that the card extends freely outwardly from the body, and a resonant chamber in the body for amplifying the sound produced by the intermittent interaction of the free end of the card with a bicycle wheel, and further including a hollow component removably mountable on the body with its interior in communication with the resonant chamber for further amplifying the sound produced by the card, and wherein the means for mounting the body to a frame member of a bicycle comprises an open channel extending into the body in which a frame member can be received.

2. A device as claimed in claim 1, wherein the resonant chamber is in the form of a bore extending through the body and open at at least one end.

3. A device as claimed in claim 2, wherein the bore extends through the body in a direction transverse to the direction in which the card extends from the body.

4. A device as claims in claim 3, wherein the bore is open at both ends and is provided with end caps for sealing the bore and altering the resonant characteristics of the chamber.

5. A device as claimed in claim 3, wherein the hollow sound-amplifying component has a generally funnel-like shape with a relatively narrow open end removably mountable on the body in communication with the resonant chamber.

6. A device as claimed in claim 5, wherein the narrow open end of the hollow sound-amplifying component fits into the said at least one open end of the bore.

7. A device as claimed in claim 6, further including an apertured reflector fitted to an opposite relatively wide open end of the hollow sound-amplifying component.

8. A device as claimed in claim 2, wherein the bore is open at both ends and is provided with end caps for sealing the bore and altering the resonant characteristics of the chamber.

9. A device as claimed in claim 2, wherein the hollow sound-amplifying component has a generally funnel-like shape with a relatively narrow open end removably mountable on the body in communication with the resonant chamber.

10. A device as claimed in claim 9, wherein the narrow open end of the hollow sound-amplifying component fits into the said at least one open end of the bore.

11. A device as claimed in claim 10, further including an apertured reflector fitted to an opposite relatively wide open end of the hollow sound-amplifying component.

12. A device as claimed in claim 2, wherein the means for mounting the body to a frame member of a bicycle comprises an open channel extending into the body in which a frame member can be received and wherein the channel is substantially parallel to the resonant chamber.

13. A device as claimed in claim 12, wherein the open channel comprises a pair of side walls and a base for receiving the frame member, the device further including a fastening means to draw the side walls together and thereby grip the frame member in the base.

14. A device as claimed in claim 1, wherein the hollow sound-amplifying component has a generally funnel-like shape with a relatively narrow open end removably mountable on the body in communication with the resonant chamber.

15. A device as claimed in claim 14, further including an apertured reflector fitted to an opposite relatively wide open end of the hollow sound-amplifying component.

16. A device as claimed in claim 1, wherein the hollow sound-amplifying component is retained in position on the body by a removable pin which passes through a hole in the body to engage the hollow sound-amplifying component, the pin also retaining the card against removal from the card holder.

17. A device as claimed in claim 1, wherein the open channel comprises a pair of side walls and a base for receiving the frame member, the device further including a fastening means to draw the side walls together and thereby grip the frame member in the base.

18. A device as claimed in claim 17, wherein the base has at least one removable lining member for accommodating frame members of different diameter.

19. A device as claimed in claim 1, wherein the card holder comprises a slot which is adapted to retain the card by its edges so that a majority of the surface of the card facing away from the body is exposed.

20. A device as claimed in claim 19, wherein the resonant chamber is open to the surface of the card facing towards the body.

21. A device as claimed in claim 1, wherein the body has an external surface including a display area, wherein the display area is disposed on the body to face in the direction opposite to the direction in which the card extends in use.

22. The combination of a device as claimed in claim 1 and a resiliently flexible card-like member mounted in the card holder.

* * * * *